United States Patent
Clayton et al.

(10) Patent No.: US 11,536,112 B2
(45) Date of Patent: Dec. 27, 2022

(54) SYSTEM AND METHODOLOGY FOR CONTROLLING ACTUATION OF DEVICES DOWNHOLE

(71) Applicant: SCHLUMBERGER TECHNOLOGY CORPORATION, Sugar Land, TX (US)

(72) Inventors: David Clayton, Angleton, TX (US); Jerome Prost, Clamart (FR); Michael Jasper, Saint Johns, FL (US); Brad Swenson, Friendswood, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 260 days.

(21) Appl. No.: 16/781,772

(22) Filed: Feb. 4, 2020

(65) Prior Publication Data

US 2020/0277839 A1 Sep. 3, 2020

Related U.S. Application Data

(60) Provisional application No. 62/801,607, filed on Feb. 5, 2019.

(51) Int. Cl.
*E21B 34/10* (2006.01)
*F16K 31/122* (2006.01)

(52) U.S. Cl.
CPC .......... *E21B 34/10* (2013.01); *F16K 31/1221* (2013.01); *F16K 31/1225* (2013.01)

(58) Field of Classification Search
CPC ... E21B 34/10; F16K 31/1221; F16K 31/1225
See application file for complete search history.

(56) References Cited

U.S. PATENT DOCUMENTS

| 4,896,722 A | 1/1990 | Upchurch |
| 6,405,803 B1 | 6/2002 | Giroux et al. |
| 6,422,317 B1 | 7/2002 | Williamson, Jr. |

(Continued)

FOREIGN PATENT DOCUMENTS

WO 2013074392 A1 5/2013

OTHER PUBLICATIONS

International Preliminary Report on Patentabitliy issued in PCT Application PCT/US2017/036458 dated Dec. 10, 2019 (12 pages).

(Continued)

*Primary Examiner* — Matthew R Buck

(57) ABSTRACT

A technique facilitates actuation of a downhole device, e.g. a flow control valve. The downhole device is shifted between positions by an actuator piston, which is movable in a first direction via hydraulic actuating fluid supplied by a first control line and in a second direction via hydraulic actuating fluid supplied by a second control line. A hydraulic circuit is coupled between the first control line and the second control line to enable a complete stroke of the actuator piston in one direction, e.g. the second direction, while limiting movement of the actuator piston to incremental movements in the other direction, e.g. the first direction. The hydraulic circuit employs a hydraulic enabled regulator having a plurality of pistons arranged to control the supply of hydraulic actuating fluid to achieve the desired incremental movements of the actuator piston.

16 Claims, 2 Drawing Sheets

(56) References Cited

U.S. PATENT DOCUMENTS

| | | | |
|---|---|---|---|
| 6,494,265 | B2 | 12/2002 | Wilson et al. |
| 6,536,530 | B2 | 3/2003 | Schultz et al. |
| 6,585,051 | B2 * | 7/2003 | Purkis ............... E21B 34/10 |
| | | | 251/60 |
| 6,763,892 | B2 | 7/2004 | Kaszuba |
| 6,782,952 | B2 | 8/2004 | Garay et al. |
| 6,869,063 | B2 | 3/2005 | Gunnarsson et al. |
| 6,951,331 | B2 | 10/2005 | Haughom et al. |
| 7,013,980 | B2 | 3/2006 | Purkis et al. |
| 7,055,598 | B2 | 6/2006 | Ross et al. |
| 7,377,327 | B2 | 5/2008 | Jackson |
| 7,510,013 | B2 | 3/2009 | Kimpel |
| 7,926,569 | B1 | 4/2011 | Wintill et al. |
| 8,006,768 | B2 * | 8/2011 | Powell ............... E21B 34/10 |
| | | | 166/386 |
| 8,056,643 | B2 | 11/2011 | Basmajian et al. |
| 8,157,016 | B2 | 4/2012 | James |
| 8,186,439 | B2 * | 5/2012 | Lauderdale ........ E21B 23/006 |
| | | | 166/375 |
| 8,322,446 | B2 * | 12/2012 | Smithson ........... E21B 47/125 |
| | | | 166/381 |
| 8,397,741 | B2 | 3/2013 | Bisset |
| 9,228,402 | B2 | 1/2016 | Strilchuk |
| 9,376,889 | B2 | 6/2016 | Reid et al. |
| 10,724,334 | B2 * | 7/2020 | Poluchalla ............ E21B 23/04 |
| 2002/0014338 | A1 | 2/2002 | Purkis et al. |
| 2008/0000643 | A1 | 1/2008 | Kimpel |
| 2009/0283276 | A1 | 11/2009 | Mandrou et al. |
| 2010/0212521 | A1 | 8/2010 | Resch et al. |
| 2011/0067886 | A1 * | 3/2011 | Moen ................. E21B 23/006 |
| | | | 166/321 |
| 2011/0100645 | A1 | 5/2011 | Yapici |
| 2012/0067593 | A1 * | 3/2012 | Powell ............... E21B 34/066 |
| | | | 166/373 |
| 2014/0014373 | A1 | 1/2014 | Richards |
| 2015/0107848 | A1 | 4/2015 | Leitch |
| 2016/0312579 | A1 | 10/2016 | Green et al. |
| 2016/0319635 | A1 * | 11/2016 | Du ..................... E21B 34/10 |
| 2020/0248533 | A1 | 8/2020 | Clayton |

OTHER PUBLICATIONS

International Search Report and Written Opinion issued in PCT Application PCT/US2017/036458 dated Feb. 28, 2018 (16 pages).

* cited by examiner

SYSTEM AND METHODOLOGY FOR CONTROLLING ACTUATION OF DEVICES DOWNHOLE

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. The present application claims priority benefit of U.S. Provisional Application No. 62/801,607, filed Feb. 5, 2019, the entirety of which is incorporated by reference herein and should be considered part of this specification.

BACKGROUND

In many well applications, a well string is deployed downhole with flow control valves, which may be actuated to control fluid flow with respect to various well zones. For example, flow control valves may be actuated between an open flow position, allowing fluid to flow into the well string from a surrounding well zone, and a closed position blocking the inflow of fluid. Some flow control valves may be actuated to various positions between the fully open position and the closed position. Various flow control valves are hydraulically actuated by delivering hydraulic actuating fluid along corresponding control lines to an actuator piston, which may be shifted via hydraulic pressure. Movement of the actuator piston between operational positions causes a corresponding transition of the flow control valve between flow positions.

SUMMARY

In general, a system and methodology are provided for facilitating actuation of a downhole device, such as a flow control valve. The downhole device is shifted between positions by an actuator piston which is movable in a first direction via hydraulic actuating fluid supplied by a first control line and in a second direction via hydraulic actuating fluid supplied by a second control line. A hydraulic circuit is coupled between the first control line and the second control line to enable a complete stroke of the actuator piston in one direction, e.g. the second direction, while limiting movement of the actuator piston to incremental movements in the other direction, e.g. the first direction. The hydraulic circuit employs a hydraulic enabled regulator having a plurality of pistons arranged to control the supply of hydraulic actuating fluid to achieve the desired incremental movements of the actuator piston. In certain embodiments, the plurality of pistons comprises two pistons arranged to deliver a larger initial volume of actuating fluid followed by subsequent smaller volumes of actuating fluid.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
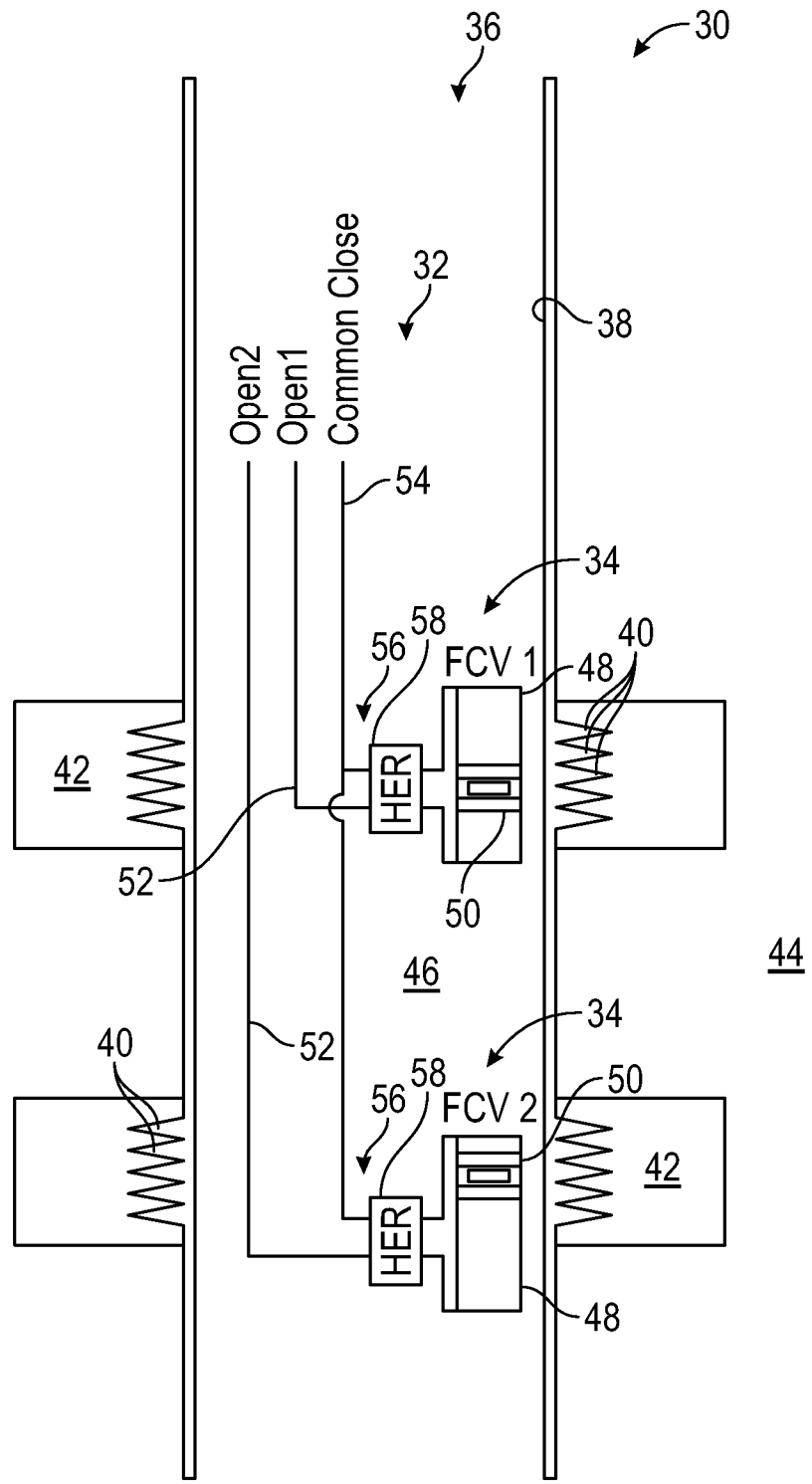
FIG. 1 is a schematic illustration of a well system having a well string deployed in a borehole and including a plurality of actuatable devices, e.g. flow control valves, controlled by a hydraulic circuit, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology which facilitate actuation of a downhole device, such as a flow control valve. The technique utilizes a hydraulic circuit, which enables shifting of the downhole device to a given operational position, e.g. a closed position, in a single continuous stroke. The hydraulic circuit also controls shifting of the downhole device to another operational position, e.g. a fully open position, in increments of given lengths.

The downhole device may be shifted between operational positions by an actuator piston, which is movable in a first direction via hydraulic actuating fluid supplied by a first control line and in a second direction via hydraulic actuating fluid supplied by a second control line. The hydraulic circuit is coupled between the first control line and the second control line to enable the complete stroke of the actuator piston in one direction, e.g. the second direction, while limiting movement of the actuator piston to incremental movements in the other direction, e.g. the first direction. The hydraulic circuit employs a hydraulic enabled regulator having a plurality of pistons arranged to control the supply of hydraulic actuating fluid to achieve the desired incremental movements of the actuator piston in one direction. In certain embodiments, the plurality of pistons comprises two pistons arranged to deliver a larger initial volume of actuating fluid followed by subsequent smaller volumes of actuating fluid.

According to an example, the hydraulic circuit may effectively be constructed as an external hydraulic system, which provides initial opening and multiple position indexing of the flow control valve or other downhole device. In this example, the hydraulic enabled regulator of the hydraulic circuit may be constructed with a small biased piston located in a larger latching or free piston for positional control of the flow control valve or other device.

The hydraulic enabled regulator provides the functionality of actuating the device step-by-step in one direction while allowing the device to move along a full stroke, from any position, when actuated in the other direction. The hydraulic enabled regulator also avoids the creation of a hydraulic lock of the actuator piston while no hydraulic control is applied. This ensures that the downhole device/ actuator piston can be mechanically shifted in case of failure of the primary hydraulic operation system or hydraulic control lines.

According to an embodiment, the hydraulic enabled regulator allows specific volumes, e.g. two specific volumes, of input flow of hydraulic fluid to enter the downhole device, e.g. flow control valve, during actuation in the incremental direction. For example, the first volume may be restricted to entry on the first actuation and the second volume enters on each subsequent actuation. If the downhole device is a flow control valve, for instance, the first volume of actuating fluid may enter during the first actuation from the fully closed position, and the second volume of actuating fluid enters for each subsequent incremental actuation toward fully open.

The downhole device may be shifted in the other direction from any position in a single, continuous stroke. After opening the flow control valve, for example, the flow control valve may be shifted to a closed position from any position with one actuation. This closing actuation may be used to effectively shift the flow control valve to a closed position while resetting the hydraulic enabled regulator to its initial position.

The hydraulic enabled regulator may be constructed with a dual piston arrangement in which one piston is not mechanically biased and the other piston is mechanically biased in a given direction. On the first actuation, the two pistons move together to supply an initial, larger volume of fluid to move the actuator piston of the downhole device. For example, this initial, larger volume of fluid may be directed to a flow control valve actuator piston to provide an initial, incremental shift of the flow control valve from its fully closed position. In other words, this larger volume of fluid shifts the flow control valve from a closed position to a first or initial incremental position. The initial incremental movement may be a longer stroke of the actuator piston than subsequent incremental movements due to the larger volume of hydraulic actuation fluid initially directed to the actuator piston.

After actuation pressure is relieved, the mechanically biased piston, e.g. the smaller piston, resets back to its biased position. However, the other piston, e.g. the larger piston, remains in its secondary, shifted position. When actuation pressure is again applied, the mechanically biased piston moves while the other piston remains stationary thus supplying a smaller volume of fluid to index the downhole device, e.g. flow control valve, to the next incremental position.

After actuation pressure is again relieved, the mechanically biased piston similarly resets back to its biased position. The incremental actuations may be continued in this manner until there are no more positions with respect to shifting the downhole device. For example, the incremental actuations of a flow control valve may continue until the flow control valve is in its fully open position. The downhole device may be shifted in the opposite direction by applying hydraulic actuation fluid under pressure in the opposite control line to fully transition the downhole device in a single stroke. If the downhole device is a flow control valve, for example, hydraulic actuation fluid may be applied under pressure in the close hydraulic line to shift the flow control valve to a fully closed position in a single stroke. The single stroke also may be used to reset the hydraulic enabled regulator.

Referring generally to FIG. 1, an example of a well system 30 is illustrated. The well system 30 may comprise a well string 32, e.g. a well completion system, having a plurality of hydraulically controlled devices 34 deployed in a borehole 36, e.g. a wellbore. In the example illustrated, the well completion system 32 is deployed downhole within well casing 38 or within other types of tubing.

The well casing 38 may be perforated with a plurality of perforations 40 extending into a plurality of corresponding well zones 42 located in a surrounding formation 44. The perforations 40 enable communication of fluids between the well zones 42 of formation 44 and an interior 46 of the well casing 38. In the example illustrated, the plurality of hydraulically controlled devices 34 comprises a plurality of flow control valves 48, which may be individually actuated to control the flow of fluid, e.g. well fluid, between each well zone 42 and a region within well casing 38. For example, each flow control valve 48 may be actuated to control the inflow of well fluids from a corresponding well zone 42 to the interior of well completion 32, e.g. to the interior of production tubing.

For purposes of explanation, well system 30 will be described as having flow control valves 48 although other embodiments may use other types of hydraulically actuated devices 34 controlled via an actuator piston 50. In the example illustrated, each flow control valve 48 comprises an actuator piston 50 movable in a first direction via hydraulic actuating fluid supplied through a first control line 52 and in a second direction via hydraulic actuating fluid supplied through a second control line 54. With respect to each flow control valve 48 (or each hydraulically controlled device 34), a hydraulic circuit 56 is coupled between the first control line 52 and the second control line 54.

The hydraulic circuit 56 comprises a hydraulic enabled regulator (HER) 58 to facilitate control over the actuation of each actuator piston 50. For example, the hydraulic circuit 56 (with the hydraulic enabled regulator 58) enables a complete stroke of the actuator piston 50 in one direction, e.g. the second direction, by supplying the hydraulic actuating fluid through the second control line 54. However, the hydraulic circuit 56 (with the hydraulic enabled regulator 58) limits movement of the actuator piston 50 to incremental movements in the other direction, e.g. the first direction. As explained in greater detail below, the hydraulic enabled regulator 58 enables a supply of different volumes of hydraulic actuating fluid to the actuator piston 50 so the actuator piston 50 may be moved in increments of different lengths.

When the well system 30 includes flow control valves 48, the first control line 52 may be an open control line through which hydraulic actuating fluid is directed to move the actuator piston 50 and corresponding flow control valve 48 to an open flow position. The second control line 54 may be a close control line through which hydraulic actuating fluid is directed to move the actuator piston 50 and corresponding flow control valve 48 to a closed flow position. In this embodiment, each flow control valve 48 is connected to a separate, dedicated open control line 52 while a common close control line 54 is connected to the plurality of flow control valves 48. However, dedicated close control lines 54 may be coupled to each corresponding flow control valve 48.

Figure 2:
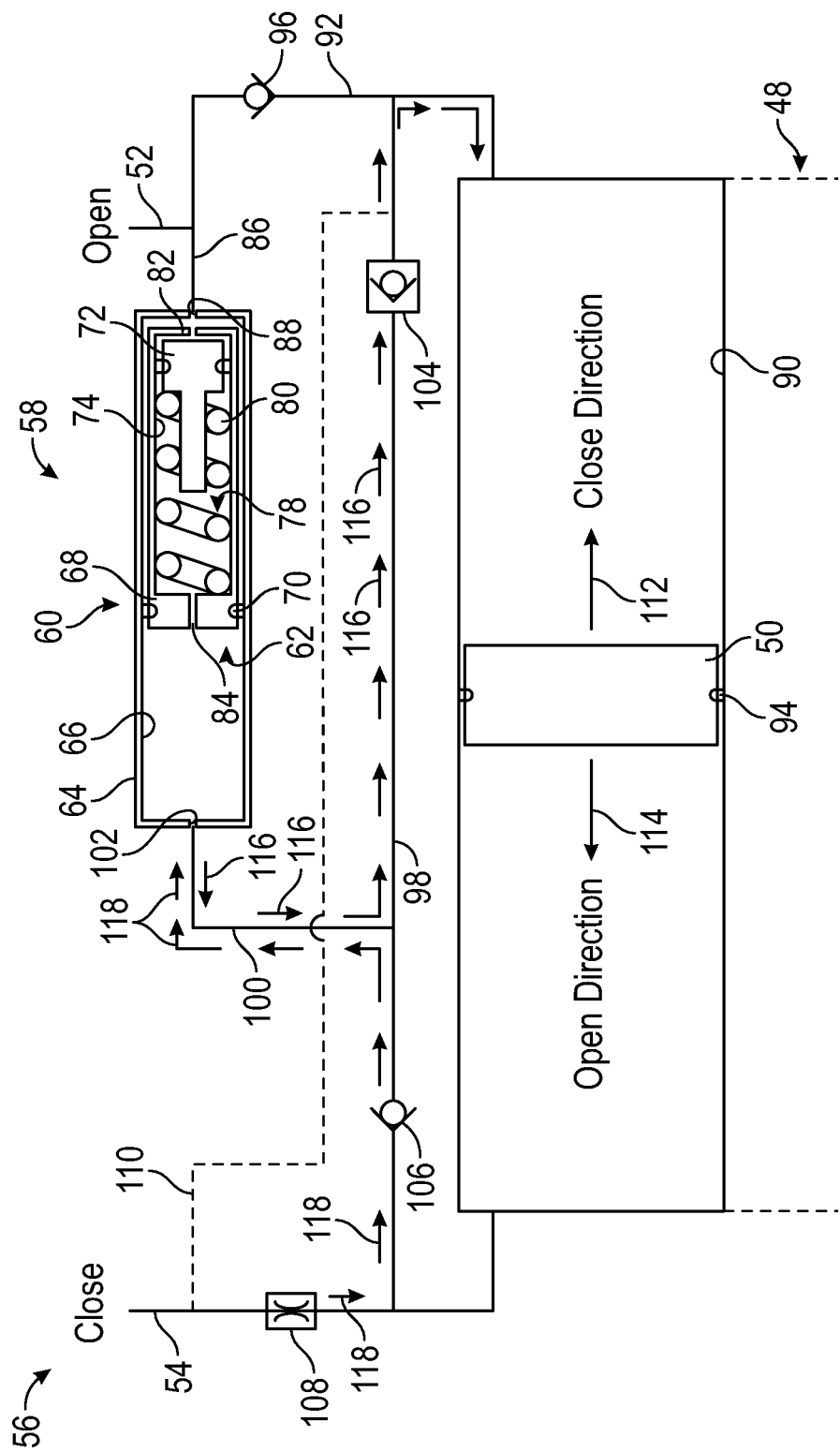
FIG. 2 is a schematic illustration of an example of the hydraulic circuit utilizing a hydraulic enabled regulator, which controls the volumes of hydraulic actuating fluid used to actuate each device, e.g. each flow control valve, to different operational positions, according to an embodiment of the disclosure.

Referring generally to FIG. 2, an example of the hydraulic circuit 56 is illustrated with an embodiment of the hydraulic enabled regulator 58. In this embodiment, the hydraulic enabled regulator 58 comprises a multi-piston assembly 60, e.g. a dual-piston assembly. The piston assembly 60 has a plurality of pistons 62 arranged to supply a plurality of volumes of hydraulic actuating fluid so that the actuator piston 50, e.g. a flow control valve actuator piston, is moved in increments of different lengths in the first direction, e.g., the open direction.

The plurality of pistons 62 may be mounted within a piston housing 64 for sliding movement along an internal cylinder 66 within the housing 64. By way of example, the plurality of pistons 62 may comprise a larger piston 68 movable along the internal cylinder 66 within housing 64. The larger piston 68 may comprise at least one seal 70 which is positioned to form a seal between the larger piston 68 and the surrounding surface forming internal cylinder 66.

Additionally, the plurality of pistons 62 may comprise a smaller piston 72 movable within an internal cavity 74 formed within the interior of the larger piston 68. The smaller piston 72 may comprise at least one seal 76, which is positioned to form a seal between the smaller piston 72 and the surrounding surface forming internal cavity 74. The smaller piston 72 may be biased toward an initial position, as illustrated in FIG. 2, by a spring member 78. The spring member 78 may be a coil spring 80 or other suitable type of spring member able to bias the smaller piston 72 toward the illustrated initial position. The internal cavity 74 and thus smaller piston 72 also are in fluid communication with the internal cylinder 66 externally of larger piston 68 via a first port 82 and a second port 84 formed through larger piston 68.

In the illustrated example, the first control line 52, e.g. open control line, is placed in fluid communication with the internal cylinder 66 via a control line segment 86, which is coupled with a port 88 formed through piston housing 64. Additionally, the first control line 52 is placed in fluid communication with a hydraulic chamber 90, containing actuator piston 50, via another control line segment 92. In the illustrated embodiment, the hydraulic chamber 90 is in the form of an actuator piston cylinder. By way of example, the actuator piston 50 may be in the form of a flow control valve actuator piston and may be placed in sliding, sealed engagement with the surrounding surface forming the actuator piston cylinder 90 via at least one piston seal 94.

A first check valve 96 may be disposed along control line segment 92 and oriented to allow flow of actuating fluid from the actuator piston cylinder 90 and along first control line 52 while blocking flow in the opposite direction. The hydraulic enabled regulator 58 further comprises a flow line 98 connected between first control line 52 and second control line 54. The flow line 98 is placed in fluid communication with the internal cylinder 66 via a control line segment 100 which is coupled with a port 102 formed through piston housing 64 on a side opposite port 88. As illustrated, a second check valve 104 and a third check valve 106 may be positioned along the flow line 98 on opposite sides of control line segment 100. According to one or more embodiments of the disclosure, the second check valve 104 may be a pilot-operated check valve.

Additionally, the second control line 54 is placed in fluid communication with actuator piston cylinder 90 on an opposite side of actuator piston 50 relative to control line segment 92. A flow restrictor 108 may be positioned along the second control line 54 such that the flow line 98 is coupled with the second control line 54 between the flow restrictor 108 and actuator piston cylinder 90. Additionally, a pilot line 110 may be coupled between second check valve 104 and second control line 54 on an opposite side of the flow restrictor 108 relative to the flow line 98. As explained in greater detail below, the pilot line 110 serves to bias the second check valve 104 to a closed position during flow of actuating fluid along the second control line 54 and into the actuator piston cylinder 90.

According to an operational example, the hydraulically controlled device 34 is in the form of a flow control valve 48, and actuator piston 50 serves as the flow control valve actuator piston. Thus, the actuator piston 50 is shifted in a close direction (represented by arrow 112) to close the flow control valve 48 and in an open direction (represented by arrow 114) to open the flow control valve 48.

During opening of the flow control valve 48, hydraulic actuating fluid is delivered under pressure through the first control line 52. The flowing actuating fluid moves into cylinder 66 via control line segment 86 and port 88 while flow along control line segment 92 is blocked via first check valve 96. As the hydraulic actuating fluid flows into cylinder 66, the actuating fluid causes an initial shifting of both the larger piston 68 and the smaller piston 72 along cylinder 66 until the larger piston 68 is stopped against the opposite end (left end in FIG. 2) of the cylinder 66.

The movement of the larger piston 68 causes hydraulic actuating fluid to be discharged from cylinder 66 and to flow through port 102, along control line segment 100, along flow line 98, through second check valve 104, and into piston cylinder 90 (see arrows 116). Continued delivery of the actuating fluid via first control line 52 also causes the smaller piston 72 to shift along internal cavity 74 until stopping against the opposite side (left side in FIG. 2) of cavity 74. The movement of the smaller piston 72 within cavity 74 causes additional hydraulic actuating fluid to be discharged through port 84 and out of cylinder 66. The additional discharge of actuating fluid from cylinder 66 similarly flows along control line segment 100, along flowline 98, through second check valve 104, and into piston cylinder 90 as indicated by arrows 116. Thus, the combined leftward movements of larger piston 68 and smaller piston 72 discharge a larger volume of actuating fluid into piston cylinder 90 compared to the volume that would be discharged via movement of either larger piston 68 or smaller piston 72 individually. The larger volume, in turn, causes a longer incremental movement of actuator piston 50 in the open direction 114.

Subsequently, pressure is reduced in first control line 52 and spring member 78 returns the smaller piston 72 to its initial position within internal cavity 74 as actuating fluid is bled back through open control line 52. As smaller piston 72 moves back to the initial biased position, actuating fluid is supplied via the second control line 54 for filling internal cavity 74. However, the larger piston 68 remains positioned on the opposite (left) side of cylinder 66. When pressure is again applied to the actuating fluid in first control line 52, the smaller piston 52 is shifted along internal cavity 74 until again stopping against the opposite/left side of the internal cavity 74.

The movement of smaller piston 72 causes a smaller volume of hydraulic actuating fluid to be discharged through port 84 and out of cylinder 66 compared to the combined discharge volume resulting from movement of both larger piston 68 and smaller piston 72. The smaller volume discharge of actuating fluid from cylinder 66 similarly flows along control line segment 100, along flow line 98, through second check valve 104, and into piston cylinder 90 as indicated by arrows 116. Because of the smaller volume of actuating fluid, the actuator piston 50 is shifted a shorter incremental distance in the open direction 114. This process of shifting the smaller piston 72 back-and-forth may be repeated to incrementally shift the actuator piston 50 the shorter incremental distances until the actuator piston 50 is fully shifted in the open direction.

The actuator piston 50 may be returned in the close direction 112 to a fully closed position in a single stroke by delivering hydraulic actuating fluid under pressure via second control line 54. As hydraulic actuating fluid is delivered under pressure along second control line 54, the flow restrictor 108 restricts flow, which increases pressure upstream of the flow restrictor 108. This increased pressure is transferred through pilot line 110 to second check valve 104 and serves to hold the second check valve 104 in a closed position to prevent further flow through flow line 98. As the hydraulic actuating fluid flows through flow restrictor 108, the actuating fluid enters piston cylinder 90 on an opposite side of actuator piston 50 and continuously shifts the actuator piston 50 in the close direction 112 until the actuator piston 50 is moved to the fully closed position. The hydraulic actuating fluid then continues up control line segment 92, through first check valve 96, and exits via first control line 52.

In the illustrated example, a portion of the hydraulic actuating fluid moving through flow restrictor 108 also flows through third check valve 106, along control line segment 100, and into cylinder 66 via port 102 as indicated by arrows 118. The flow of fluid through port 102 into cylinder 66 ensures that both the larger piston 68 and the smaller piston 72 are return/reset to their initial positions illustrated in FIG. 2. At this stage, the opening sequence may be repeated in which a plurality of different volumes of hydraulic actuating fluid are delivered into piston cylinder 90 to shift actuator piston 50 in open direction 114 in increments of different lengths.

Although the operational example described above refers to flow control valves 48, the hydraulic circuit 56 and hydraulic enabled regulator 58 may be used to control actuation of a variety of hydraulically actuated devices. The hydraulic enabled regulator 58 enables such devices to be moved in a continuous, full stroke in one direction and in increments of different lengths in another, e.g. opposite, direction. When used with flow control valves, the hydraulic enabled regulator 58 may be coupled with the actuator piston 50 in a manner to provide incremental movements in the open direction, as described above, or in the close direction while the full stroke motion is provided in the opposite direction. It should be noted the arrangement of hydraulic circuit 56 also avoids the creation of a hydraulic lock of the actuator piston 50 while no hydraulic control is applied. This ensures that the downhole device 34/actuator piston 50 can be mechanically shifted in case of failure of the primary hydraulic operation system or hydraulic control lines.

Depending on the application, the components and component configurations of the well system 30, hydraulic circuit 56, and/or hydraulic enabled regulator 58 may vary. For example, the multi-piston assembly 62 may comprise additional pistons and/or pistons of different sizes and strokes to enable delivery of different volumes of actuating fluid. The well system 30 also may comprise many types of well completions, flow control devices, or other types of hydraulically actuated devices disposed along a wellbore or other type of borehole.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for actuating a device, comprising:
   an actuator piston disposed in a hydraulic chamber, the actuator piston being movable in a first direction via hydraulic actuating fluid supplied by a first control line and in a second direction via hydraulic actuating fluid supplied by a second control line; and
   a hydraulic circuit coupled between the first control line and the second control line, the hydraulic circuit enabling a complete stroke of the actuator piston within the hydraulic chamber in the second direction by supplying the hydraulic actuating fluid through the second control line, the hydraulic circuit further comprising a hydraulic enabled regulator to control incremental movement of the actuator piston within the hydraulic chamber in the first direction, the hydraulic enabled regulator having a plurality of pistons arranged to supply a plurality of volumes of hydraulic actuating fluid so the actuator piston is moved along the hydraulic chamber in increments of different lengths, wherein the plurality of pistons comprises a larger piston movable in a cylinder, the larger piston having an internal cavity in fluid communication with an interior of the cylinder via a port; and a smaller piston movable within the internal cavity of the larger piston.

2. The system as recited in claim 1, wherein the actuator piston is a flow control valve actuator piston.

3. The system as recited in claim 2, wherein the first control line is an open line through which hydraulic actuating fluid is supplied to move the flow control valve actuator piston toward an open position.

4. The system as recited in claim 3, wherein the second control line is a close line through which hydraulic actuating fluid is supplied to move the flow control valve actuator piston toward a closed position.

5. The system as recited in claim 1, wherein supplying hydraulic actuating fluid under pressure through the first control line causes an initial shifting of both the larger piston and the smaller piston to supply an initial volume of hydraulic actuating fluid which shifts the actuator piston an initial increment.

6. The system as recited in claim 5, wherein when pressure in the first control line is reduced, hydraulic actuating fluid supplied by the second control line enters the internal cavity and the smaller piston moves back to an initial position within the internal cavity.

7. The system as recited in claim 6, wherein the smaller piston is moved back to the initial position via a spring.

8. The system as recited in claim 7, wherein when pressure is again applied in the first control line the smaller piston is shifted without moving the larger piston to thus supply a relatively smaller volume of hydraulic actuating fluid for shifting the actuator piston a subsequent increment of shorter length than the initial increment.

9. A system, comprising:
   a well string having a plurality of flow control valves shiftable between open and closed positions via movement of a flow control valve actuator piston, each flow control valve being coupled with an open hydraulic line and a close hydraulic line via a hydraulic circuit, the open hydraulic line and the close hydraulic line being configured to deliver hydraulic actuating fluid under suitable pressure to move the flow control valve actuating piston;
   the hydraulic circuit being coupled between the open hydraulic line and the close hydraulic line, the hydraulic circuit enabling a complete stroke of the flow control valve actuator piston within an actuator piston cylinder in a close direction by supplying the hydraulic actuating fluid through the close hydraulic line, the hydraulic circuit further comprising a hydraulic enabled regulator to control incremental movement of the flow control valve actuator piston within the actuator piston cylinder in an open direction, the hydraulic enabled regulator having a plurality of pistons arranged to supply a plurality of volumes of hydraulic actuating fluid so the flow control valve actuator piston is moved along the actuator piston cylinder in increments of different lengths, wherein the plurality of pistons comprises a larger piston movable in a cylinder, the larger piston having an internal cavity in fluid communication with an interior of the cylinder via a port; and a smaller piston movable within the internal cavity of the larger piston.

10. The system as recited in claim 9, wherein the hydraulic circuit further comprises a flow restrictor positioned along the close hydraulic line.

11. The system as recited in claim 10, wherein the hydraulic circuit further comprises a plurality of check valves arranged to control communication of hydraulic actuating fluid between the hydraulic enabled regulator and the flow control valve actuator piston.

12. The system as recited in claim 9, wherein supplying hydraulic actuating fluid under pressure through the open hydraulic line causes an initial shifting of both the larger piston and the smaller piston to supply an initial volume of hydraulic actuating fluid for shifting the flow control valve actuator piston an initial increment.

13. The system as recited in claim 12, wherein when pressure in the open hydraulic line is reduced, hydraulic actuating fluid supplied by the close hydraulic line enters the internal cavity and the smaller piston moves back to an initial position within the internal cavity under the influence of a spring bias.

14. A method, comprising:
    positioning a flow control valve along a well string;
    coupling the flow control valve with a hydraulic circuit which operates to control delivery of actuating fluid to a flow control valve actuating piston when the flow control valve is shifted to different operational positions; and
    using the hydraulic circuit to limit movement of the flow control valve actuating piston to desired incremental movements when the flow control valve is shifted toward an open position by delivering different volumes of actuating fluid to the flow control valve actuating piston by employing a hydraulic enabled regulator having a dual piston arrangement, the dual piston arrangement comprising a smaller piston slidably mounted within an interior cavity of a larger piston.

15. The method as recited in claim 14, wherein using further comprises using a plurality of check valves arranged to control communication of hydraulic actuating fluid between the dual piston arrangement and the flow control valve actuator piston.

16. The method as recited in claim 14, further comprising using the hydraulic circuit to enable movement of the flow control valve actuator piston to a closed position in a single stroke.

* * * * *